US006753369B2

(12) United States Patent
Hill, Jr. et al.

(10) Patent No.: US 6,753,369 B2
(45) Date of Patent: Jun. 22, 2004

(54) LEATHER WATERPROOFING FORMULATION AND LEATHER GOODS WATERPROOFED THEREWITH

(75) Inventors: Walter Bernard Hill, Jr., Germantown, TN (US); Naim Barcellos Miguel, Cordova, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 36 days.

(21) Appl. No.: 09/978,159

(22) Filed: Oct. 16, 2001

(65) Prior Publication Data

US 2003/0092807 A1 May 15, 2003

(51) Int. Cl.[7] .................................................. C08K 5/05

(52) U.S. Cl. ....................... 524/379; 524/766; 524/767; 524/773; 524/796; 8/94.22; 252/8.57

(58) Field of Search ................................ 524/379, 766, 524/767, 773, 796; 8/94.22; 252/8.57

(56) References Cited

U.S. PATENT DOCUMENTS

| | | | | | |
|---|---|---|---|---|---|
| 2,205,882 | A | | 6/1940 | Graves | 149/5 |
| 2,205,883 | A | | 6/1940 | Graves | 149/5 |
| 2,452,536 | A | | 11/1948 | Kirk et al. | 8/94.21 |
| 2,865,878 | A | | 12/1958 | Toothill, Jr. et al. | 260/29.6 |
| 3,620,990 | A | | 11/1971 | Hazen et al. | 260/2.5 R |
| 3,719,517 | A | | 3/1973 | Muck et al. | 427/245 |
| 3,720,637 | A | | 3/1973 | Bacskai | 260/29.7 H |
| 3,784,400 | A | * | 1/1974 | Cassella et al. | 117/62.2 |
| 3,912,679 | A | | 10/1975 | Bischoff et al. | 260/28.5 R |
| 3,979,532 | A | | 9/1976 | Muck et al. | 117/37 R |
| 3,993,618 | A | | 11/1976 | Muck et al. | 524/483 |
| 4,104,216 | A | | 8/1978 | Clampitt | 260/23 AR |
| 4,130,213 | A | | 12/1978 | Wszolek | 215/349 |
| 5,279,613 | A | | 1/1994 | Schaffer et al. | 8/94.1 R |
| 5,330,537 | A | | 7/1994 | Stewart et al. | 8/94.1 R |
| 5,433,752 | A | * | 7/1995 | Birkhofer et al. | 8/94.21 |
| 5,457,835 | A | | 10/1995 | Manzo | 8/94.22 |
| 5,580,355 | A | | 12/1996 | Groth et al. | 8/94.33 |
| 5,741,434 | A | | 4/1998 | Ritter et al. | 252/8.57 |
| 5,931,970 | A | | 8/1999 | Kaussen | 8/94.2 |

FOREIGN PATENT DOCUMENTS

| | | | |
|---|---|---|---|
| AT | 82-2401 | 6/1982 | |
| CS | 69-4962 | 7/1969 | |
| CS | 69-6480 | 9/1969 | |
| CS | 71-1810 | 9/1969 | |
| DE | 2207534 | 11/1972 | |
| DE | 82-3201226 | 1/1982 | |
| DE | 89-3930217 | 9/1989 | |
| DE | 92-4205839 | 2/1992 | |
| EP | 0 324 536 | 1/1989 | C14C/9/00 |
| EP | 0 412 389 | 2/1991 | |
| EP | 93-116873 | 10/1993 | |
| JP | 74-30572 | 3/1974 | |
| JP | 80-155388 | 11/1980 | |
| JP | 82-137793 | 8/1982 | |
| JP | 94-292008 | 11/1994 | |
| JP | 96-235057 | 9/1996 | |
| SU | 265063 | 2/1967 | |

OTHER PUBLICATIONS

LUBRITAN™ WP Acrylic Syntan, Rohm and Haas Co., "Material Data Sheet" (Jun. 25, 1992).

LEUKOTAN® XE3 Tanning Agent, Rohm and Haas Co., "Material Data Sheet".

BASF, "BASF Densodrin Products for optimum results" Information on Products.

124:292806, *Development on cattlehide foam type of shoe–vamp leather*, Wang, Wenyong, (1998). (Abstract).

124:32418, *Development on cattlehide foam type of shoe–vamp leather*, Wang, Wenyong (1998). (Abstract).

117:10214, *Development in Technology of making Huabei–Road goatskin leather*, Zhu et al., (1998). (Abstract).

111:99360, *Waterproofing and oilproofing treatment enhancement by pre– or postreatment with amines, resins, polymers, or quaternary ammonium compounds*, Muench et al., (1998). (Abstract).

98:216702, *Hygienic properties of fiber substrates for leather substitutes treated with hydrophilic polymers*, Sokolova et al., (1998). (Abstract).

95:63704, *Tannage with aluminum salts*, no author listed (1998). (Abstract).

95:44074, *Gas–chromatographic study of a hydrophilic additive made of the oligomeric nitrile rubber SKN–26–1A for poly(vinyl chloride)*, Baramboim et al., (1998). (Abstract).

79:6405, *Arti substitutes were prepd. From combinations of textile support, polymer binder, and filler*, no author listed, (1998). (Abstract).

Izv. Vyssh. Uchebn. Zaved., Tekhnol. Legk. Prom–sti. (1966), (5), 46–53. (Abstract).

International Search Report for PCT/US02/32495.

PCT Written Opinion for PCT/US02/32495, dated Aug. 14, 2003.

* cited by examiner

*Primary Examiner*—William Cheung
(74) *Attorney, Agent, or Firm*—Kilyk & Bowersox, P.L.L.C.

(57) ABSTRACT

The present invention relates to novel formulations for water proofing leather, a process for waterproofing leather, and leather goods waterproofed by the formulations and processes of the present invention. More specifically, the present invention relates to the use of a composition containing a salt of polyalkyl carboxylic acid anhydride, an aliphatic carboxylic acid amide, a fatty alcohol or blend of fatty alcohols, an alcohol cosolvent, a preservative, and water for imparting improved hydrophobicity, flexibility, and/or product feel of the finished leather goods.

46 Claims, No Drawings

LEATHER WATERPROOFING FORMULATION AND LEATHER GOODS WATERPROOFED THEREWITH

FIELD OF THE INVENTION

The present invention relates to novel formulations for waterproofing leather, processes for waterproofing leather, and leather goods waterproofed by the formulations and processes of the present invention. More specifically, this invention relates to the use of a composition containing the sodium salt of polyalkyl carboxylic acid anhydride, and/or an aliphatic carboxylic acid amide, a fatty alcohol or blend of fatty alcohols, an alcohol cosolvent, a preservative, and water for imparting improved hydrophobicity, flexibility, and product feel of the finished leather goods.

BACKGROUND OF THE INVENTION

To control the mechanical, physical, and chemical properties of leather, such as softness, flexibility, and hydrophobicity (waterproof and/or water repellent ability), aqueous fat emulsions (fat-liquors) which are generally based on petrochemically produced or natural oils and fats are used. Polymeric products, such as unsaturated dicarboxylic acid derivatives and long chain olefins that have fat-liquoring properties for leather and fur skins are used as water repellents for leather, hides and fur skins.

For example, EP-A-412 389 relates to the use of water repellents for leather. In particular, this published application shows the use of copolymers of $C_8$- to $C_{40}$-monoolefins and ethylenically unsaturated $C_4$- to $C_8$-dicarboxylic anhydrides, converted into aqueous solutions or dispersions by solvolysis of the anhydride groups, with, for example, bases such as amines, or partial esterification of the anhydride groups with alcohol and at least partial neutralization of the resulting carboxyl groups with bases in an aqueous medium.

U.S. Pat. No. 5,433,752 relates to the use of the reaction products of homo- or copolymers based on monoethylenically unsaturated dicarboxylic anhydrides with amines and alcohols. This patent, however, shows that the monoethylenically unsaturated component used to derivatize the dicarboxylic anhydride should be an aromatic vinyl compound, such as styrene.

Various publications relate to the preparation of copolymers containing an alpha-olefin modified carboxylic acid or carboxylic acid derivative, such as maleic anhydride. For example, U.S. Pat. No. 4,104,216 relates to copolymers containing an alpha-olefin and alpha, beta-ethylenically unsaturated carboxylic acid plasticized with a selected long chain fatty acid.

U.S. Pat. No. 4,130,213 relates to a plastisol composition containing a copolymer of a normal alpha-olefin and maleic anhydride.

A common leather industry waterproofing material is a copolymer of cetyleicosyl ($C_{16}$ to $C_{20}$) methacrylate ("CETA") and acrylic acid ("AA") as shown in U.S. Pat. No. 5,330,537. All patents, applications, and publications mentioned here and throughout the application are incorporated in their entirety by reference herein and form a part of the present application.

A common and successful conventional waterproofing formulation, Lubritan WP, available from Rohm & Haas, is a CETA acrylate in a toxic solvent and water. However, Lubritan WP has certain disadvantages including toxicity and a detrimental environmental impact.

An improved waterproofing treatment for leather and hides, a composition for achieving the waterproofing treatment, and hide or leather goods with improved waterproof and/or water repellent characteristics would be desirable by those in the industry. Particularly desired by the leather treating industry is a formulation with low toxicity, easy handling properties, good waterproofing qualities, and/or which does not have an adverse impact on the environment.

SUMMARY OF THE PRESENT INVENTION

It is a feature of the present invention to provide a method for improving the water repellency or waterproof characteristics of leather without an adverse environmental impact. It is another feature to provide leather goods with improved waterproof and/or water repellant characteristics. Finally, a waterproofing composition for leather or hide with low toxicity is provided by the present invention.

In one of its embodiments, the present invention relates to a composition, also referred to herein as a formulation, for waterproofing leather. In this embodiment, a composition containing the combination, mixture, or reaction product of an alpha-olefin poly(carboxylic acid anhydride), or an alkali salt thereof, a fatty acid amide, a fatty alcohol or blend of fatty alcohols, a shorter chain alcohol cosolvent, a preservative, and water has been discovered to provide improved processing characteristics and environmental impact when used in the waterproofing of leather. The compositions of the present invention can be used with or without conventional syntans and fat-liquors to provide roundness, grain smoothness, firmness, softness, and lubrication of hide or leather fibers. In addition, the resulting leather goods have water repellency, appearance, and texture which are generally equal to or improved relative to the properties of conventionally waterproofed leather. Finally, the composition of the present invention has low toxicity, easy handling characteristics, and minimal environmental impact.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purpose of the present invention, as embodied and broadly described herein, the present invention relates in an embodiment to a composition of matter containing:

a) at least one hydrocarbon-modified carboxylic acid anhydride, or the alkali salt thereof, which can be prepared, for example, by the reaction of the anhydride with an alkali material, such as caustic soda;

b) at least one aliphatic acid amide;

c) at least one fatty alcohol or blend of fatty alcohols;

d) at least one alcohol cosolvent;

e) at least one preservative; and f) water.

The present invention further provides a method for imparting water repellency to leather or hide by contacting leather, or a hide to be processed into leather, with a composition of the present invention.

In another embodiment of the present invention, a single component, the aliphatic acid amide of a hydrocarbon-modified carboxylic acid anhydride, or the alkali salt thereof is dissolved or dispersed in an ecologically desirable solvent or blend of co-solvents, such as butyl alcohol and water. The solution or mixture so prepared is used to advantageously treat leather at various stages of the leather manufacture procedure.

In yet another embodiment of the present invention, a leather-treating formulation is provided containing a hydrocarbon-modified carboxylic acid anhydride or alkali salt thereof, and/or an aliphatic acid amide, or an alkali salt thereof.

It is to be understood that both the foregoing general description and the following detailed description are exemplary and explanatory only and are intended to provide further explanation of the present invention, as claimed.

DETAILED DESCRIPTION OF THE PRESENT INVENTION

In one embodiment, the present invention can be practiced by combining, mixing, reacting, or otherwise contacting the following components:

1. At least one hydrocarbon-modified carboxylic acid anhydride, or an alkali salt thereof;
2. At least one aliphatic acid amide;
3. Caustic soda;
4. One or more fatty alcohols, preferably $C_{20}$ and higher (e.g., $C_{20}$–$C_{200}$);
5. At least one shorter carbon chain alcohol, such as butylpropanol;
6. At least one preservative; and
7. Water.

Component 1, above, a hydrocarbon-substituted carboxylic acid anhydride, or the alkali salt of the hydrocarbon-substituted carboxylic acid anhydride, can be derived from the reaction of, for example, maleic anhydride or a poly (maleic anhydride) with a hydrocarbon such as, for example an alpha-olefin material. Alternatively, the alkali salt of the anhydride can be made or generated in situ by the reaction of the acid anhydride with Component 3, caustic soda. An example of such a hydrocarbon-substituted carboxylic acid anhydride material is PAMA 2428, a medium molecular weight (5K to 10K amu) copolymer of polyolefin ($C_{24}$–$C_{28}$) and maleic anhydride, CAS 68459-79-0. (See U.S. Pat. Nos. 3,620,990 and 4,104,216). The alkali salt of the hydrocarbon-substituted carboxylic acid anhydride can be, but is not limited to, the sodium salt or the potassium salt.

Additional hydrocarbon-substituted carboxylic acid anhydrides useful in the present invention can include styrene maleic anhydride, such as PAMA 1050. Depending on the olefin chosen, its type of reaction or mixing with the carboxylic acid anhydride, and the degree, if any, of hydrogenation or substitution of any double bonds, the resulting hydrocarbon-substituted anhydride can be an alkenyl or alkyl anhydride, or mixture thereof. Linear olefins, branched olefins, and mixtures thereof are useful for reacting herein with the carboxylic acid anhydride. Hydrocarbon substituents useful for reacting with the carboxylic acid anhydride herein to produce the substituted anhydride or alkali salt thereof include, but are not limited to, polyethylene, polypropylene, polyisopropylene, polybutylene, polyisobutylene, oligomers of 1-octene, oligomers of 1-decene, oligomers of 1-dodecene, comonomers thereof, copolymers thereof, and/or mixtures thereof.

The preferred molecular weight range of the hydrocarbon or olefin chain is from about 500 to about 1,000,000 amu. A more preferred range is from about 500 to about 20K amu. A most preferred molecular weight range is from about 5K to about 10K amu.

Thus, for example, and not as a limitation herein, useful carboxylic acid anhydrides can include polyisobutylene succinic anhydride (PIBSA) or the alkali salt thereof.

The relative molar ratio of the olefin to poly(carboxylic acid anhydride) useful herein can range from about 0.1/99.9 (olefin/acid anhydride) up to and including about 99.9/0.1 (olefin/acid anhydride). The hydrocarbon-modified carboxylic acid and anhydride or salt thereof can be present in any effective amount in the formulation of one embodiment of the present invention. Preferred amounts of hydrocarbon-modified carboxylic acid and anhydride or salt thereof can include from about 0.3 to about 3.0 wgt percent, and more preferably from about 0.5 to about 1.5 wgt percent in a leather or hide treating aqueous or aqueous-alcohol solution.

Component 2, above, can be medium to long carbon chain aliphatic and/or olefinic acid amides. By "medium to long carbon chain aliphatic and/or olefinic acid amides" herein is preferably meant $C_{10}$ and above in carbon chain length (e.g., $C_{10}$–$C_{100}$). While both branched and linear carbon chains and mixtures thereof are useful herein, it is preferred to have a substantial amount of linear aliphatic acid amide. In a more preferred embodiment, the acid amide is a linear carboxylic acid amide, and a most preferred acid amide is oleic acid amide of sarcosine ($HOOC—CH_2—N(CH_3)—CO—Cl_7H_{33}$) as shown in the structure below.

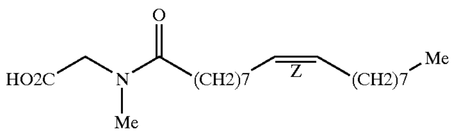

This preferred amino acid amide is widely available (CAS#110-25-8), for example, as Croda O, or can be prepared by the reaction of n-methylglycine with oleic acid. Examples of additional useful amino acid amides herein include, but are not limited to, alkyl esters of amino acid amides, alkyl ethers of amino acid amides, and glycol ethers of an acid amide.

Component 3, above, is caustic soda, useful herein as a solution of sodium hydroxide in water. The caustic soda is effective in the present invention for providing an alkali ion for the formation of the alkali salt of the acid amide of Component 2. The concentration of the caustic soda solution useful as Component 3 in an embodiment of the present invention can vary from about 10 weight percent solids in water to about 90 weight percent solids in water. A preferred concentration of the caustic soda solution added as Component 3 to the composition of the present invention is about 50 weight percent sodium hydroxide in water. However, it will be clear to those skilled in the art, and it is included within the scope of the present invention, that equivalents of the present invention can be attained by adding higher or lower amounts of a lower or higher concentration caustic solution to the compositions taught and claimed herein to achieve substantially the same result.

Component 4, above, a fatty alcohol, can be a medium to long carbon chain alkyl alcohol or mixture of alcohols, both branched and linear, and mixtures or blends thereof. By "medium to long carbon chain alkyl alcohol" herein is meant a $C_{12}$ and higher carbon chain length (e.g., $C_{12}$–$C_{100}$). A preferred alkyl alcohol mixture or blend contains a significant amount of one or more linear alkyl alcohols. A more preferred fatty alcohol is a linear $C_{20}$ alcohol, $C_{22}$ alcohol, or higher carbon chain alcohol, such as those available as alcohol bottoms from the distillation of short chain alcohols. A most preferred linear alkyl alcohol is Alfol 20+, available from Sasol. Other examples of fatty alcohols useful in certain embodiments herein include, but are not limited to, Epal 20+, dodecanol, and eicosanol, and mixtures thereof. The fatty alcohol is useful in the compositions of an embodiment of the present invention for, among other properties, minimizing the foaming potential during the admixing of the components. In addition, the fatty alcohol has been found to improve the waterproof characteristic of the resulting leather treated according to the present invention. Finally, the use of a fatty alcohol according to an embodiment of the present invention has been discovered to improve the feel of the leather treated with the compositions of the present invention.

Component 5, above, can be a shorter carbon chain linear and branched alcohol, or mixture of such alcohols, which are useful as a cosolvent herein for modifying as needed, and/or improving the dispersancy of the various other components in the compositions of the present invention. By "shorter carbon chain linear and branched alcohol" herein is meant carbon chains of $C_{10}$ or less. If Component 5 is a mixture of shorter carbon chain alcohols, it is preferred that each of the alcohols in the mixture have carbon chain lengths of $C_{10}$ or less (e.g., $C_1$–$C_{10}$). Thus, for example, and not as a limitation herein, butylpropanol was added as a cosolvent to compositions within an embodiment of the present invention to assist in dispersing the hydrocarbon-substituted carboxylic acid anhydride, such as PAMA 2428, and also to improve the stabilization of the resulting solution or emulsion. A common industry cosolvent often used for improved dispersancy and stabilization is butyl cellusolve (also known as 2-butoxyethanol), however, this material is less desirable because of its severe toxicity and listing on the EPA's SARA 313 list. The butylpropanol useful in the present invention has little to no known toxicity, is not currently reportable under EPA's SARA 313 requirements, and performs substantially better in the present invention than does butyl cellusolve. A particularly preferred shorter chain alcohol useful in the present invention as Component 5 comprises a butyl propanol, such as but not limited to, Dowanol PnB. In another preferred embodiment, the shorter carbon chain linear or branched alcohol useful in the present invention as Component 5 is butyl propanol. Other examples of shorter carbon chain linear and branched alcohols useful as cosolvents herein include, but are not limited to, propylpropanol, pentylpropanol, 2-ethyl hexanol, and butyl ethanol, and mixtures thereof.

Component 6 in the present invention is a preservative generally used for water-based products. Such materials are well known, commercially available, and useful in preventing the deterioration or oxidation of organic materials in water-borne formulations. A preservative particularly useful as Component 6 in the present invention is a Kathon known as Busan 1078, available from Rohm & Haas. Other commercial preservatives useful in the present invention as Component 6 can include, but are not limited to, Busan 1104, and Busan 1024. A particularly useful preservative in an embodiment of the present invention is isothiazolinone containing, for example, a blend of 5-chloro-2-methyl-4-isothiazolin-3-one and 2-methyl-4-isothiazolin-3-one. Other preservatives known to those of ordinary skill in the art can be substituted herein as Component 6 without deviating from the scope of the present invention.

Component 7, above, is water and no limitations or specific requirements for the water are needed. Thus, trace and/or common impurities and standard variations in the pH of the water are not a problem in the practice of the present invention.

Other additives which can be used in the present invention can include silicones, glycols, and styrene-maleic anhydrides. In particular, fluorocarbons, silicones, hydrophobic silica, natural and synthetic waxes, and various oils can be advantageously added to the compositions of the present invention, and are included within its scope.

The amounts of Components 1–7 useful in the present invention can vary according to the amount and type of waterproof and/or water repellent characteristics, feel, and texture desired of the finished leather goods, as well as the needs or desires for modifying the processing parameters, and cost of the treatment procedure. All amounts disclosed herein are provided in weight percent, unless otherwise indicated.

Examples of ranges of the effective amounts in weight percent (each based on the weight of the composition or formulation) of Components 1–7 useful in the compositions according to an embodiment of the present invention can include:

Component 1: from about 1.0 to about 99.0 weight %, and more preferably from about 5 to about 40 weight %, and most preferably from about 18 to about 22 weight %.

Component 2: from about 1.0 to about 99.0 weight %, and more preferably from about 2 to about 20 weight %, and most preferably from about 5 to about 7 weight %.

Component 3: from about 1.0 to about 99.0 weight %, and more preferably from about 1.0 to about 20 weight %, and most preferably from about 4 to about 6 weight %.

Component 4: from about 1.0 to about 99.0 weight %, and more preferably from about 1.5 to about 10 weight %, and most preferably from about 2 to about 6 weight %.

Component 5: from about 1.0 to about 99.0 weight %, and more preferably from about 1.0 to about 60 weight %, and most preferably from about 5 to about 20 weight %.

Component 6: from about 0.0001 to about 20.00 weight %, and more preferably from about 0.002 to about 2.00 weight %, and most preferably from about 0.02 to about 0.20 weight %.

Component 7: from about 1.0 to about 99.0 weight %, and more preferably from about 20 to about 80 weight %, and most preferably from about 40 to about 60 weight %.

Thus, in one embodiment of the present invention, a composition is provided containing:

a) at least about 5.0 weight percent of a poly-alpha-olefin substituted poly(maleic anhydride);

b) at least about 3.0 weight percent of the oleic acid amide of sarcosine;

c) at least about 3.0 weight percent of caustic soda, delivered as, for example, 50% sodium hydroxide solids in water;

d) at least about 1.0 weight percent of a blend of $C_{20}$–$C_{22}$ fatty alcohols;

e) at least about 10.0 weight percent butylpropanol;

f) at least about 0.05 weight percent preservative; and g) at least about 20 weight percent water, all based on the weight of the composition.

In another embodiment of the present invention, a composition is provided containing:

a) from about 10 to about 30 weight percent of a poly-alpha-olefin substituted poly(maleic anhydride);

b) from about 3 to about 10 weight percent of the oleic acid amide of sarcosine;

c) from about 3 to about 10 weight percent of caustic soda, delivered as 50% by weight sodium hydroxide solids in water;

d) from about 1 to about 5 weight percent of a blend of $C_{20}$–$C_{22}$ fatty alcohols;

e) from about 10 to about 20 weight percent butylpropanol;

f) from about 0.05 to about 1.50 weight percent preservative; and g) from about 20 to about 80 weight percent water.

An example of a more preferred embodiment of the present invention includes a formulation containing:

| | Weight % |
|---|---|
| Component 1 = hydrocarbon-substituted maleic anhydride | 20.0 |
| Component 2 = oleoyl sarcosine | 5.90 |
| Component 3 = caustic soda | 4.80 |
| Component 4 = fatty alcohol blend | 2.70 |
| Component 5 = short chain alcohol cosolvent | 14.00 |
| Component 6 = preservative | 0.10 |
| Component 7 = water | 52.50 |

A preferred formulation according to the present invention can have a solids level ranging from about 0.1 wt % to about 100 wt %. In more preferred embodiments of the present invention, the percent active solids is from about 20 to about 50 percent by weight of the composition, more preferably is from about 25 to about 45 percent by weight of the composition, and most preferably is from about 30 to about 40 percent by weight of the composition.

The formulations of the present invention are preferably stable oil-in-water emulsions, however, water-in-oil emulsions of the present inventive formulations can also be achieved by use of emulsifiers known to those skilled in the art, and both water-in-oil and oil-in-water emulsions are within the scope of the present invention. In addition to the emulsions, aqueous dispersions and solutions are also included in the compositions within the scope of the present invention.

The leather treating formulations of the present invention are therefore primarily water-based, with the addition of cosolvents of low toxicity. The percentage of water useful in the compositions herein is from about 40 to about 80 percent by weight of the composition, more preferably is from about 45 to about 75 percent by weight of the composition, and most preferably is from about 50 to about 65 percent by weight of the compositions.

The compositions of the present invention can be applied to leather at various times during the processing, tanning, retanning, and post treatment periods in leather manufacture. In general, leather treatment involves the tanning of hide with, for example, chrome by placing the hide in a drum, vat, or other container and adding the tanning agent(s). The result of this tanning step is an intermediate product no longer referred to as hide, but referred to as leather in a wet-blue state. Leather which is wet-blue is relatively stable against rapid oxidation or other deterioration and can be stored and shipped, unlike raw hide which can oxidatively degrade. After the wet-blue stage, the leather is retanned for the purpose of adding desired color, feel, softness, oils, texture, and/or physical imprints. It is during the retanning operation that the compositions of the present invention are preferably utilized. However, treatments for any type of leather, including and not limited to wet blue, vegetable tanned leather, mineral free leather, wet white leather, and others are included in the scope of the embodiments according to the present invention. Various post treatments can also be utilized in the preparation of finished leather goods, and examples of post treatment include exposure of the leather to chrome, aluminum or zinc ions. Such exposure to metal ions greatly improves the flex of the leather by chemically reacting with available bonds, thereby preventing the attraction of water molecules to the same bonding sites. However, flex-enhancing metals, such as chrome, used in post treatment can give the leather a less desirable thin feel, thereby requiring additional materials to add fullness to the leather.

Leather is required to surpass many tests to be commercially viable for use in finished goods. The particular tests to be performed and necessary results vary depending on the end uses of the finished leather. Thus, sometimes color is more important than penetration, and vice versa, for certain end uses. Shoe leather must be stiffer than coat or glove leather, for example. In evaluating the leather treated with the compositions of the present invention, several tests were employed and are referred to hereafter as:

ASTM Test Method D2211-00 Standard Test Method for Elongation of Leather

ASTM Test Method D2209-00 Standard Test Method for Tensile Strength of Leather

ASTM Test Method D2099-00 Standard Test Method for Dynamic Water Resistance of Shoe Upper Leather by the Maeser Water Penetration Tester In the test results reported herein, all compositions were applied to the leather at a dosage of 4.5 weight percent based on active ingredients, unless otherwise indicated.

EXAMPLE

Example 1

Preparation of A Composition of the Present Invention (Composition 1)

A composition according to an embodiment of the present invention was prepared by dispersing in water heated to 85 degrees C. 240 grams of KW115 Intermediate. Sodium hydroxide, 57.6 grams, was added to convert the anhydride to the corresponding sodium salt. Oleoyl sarcosine, 70.8 grams, was added and converted to its corresponding sodium salt by the sodium hydroxide already present. This was followed by the addition of 32.4 grams of Alfol 20+ fatty alcohol, and 1.2 grams of Busan 1078 preservative was added with stirring. Finally, butylpropanol, 168 grams, was added to act as both a solvent and dispersant. All additions were conducted with stirring and the composition was allowed to cool to room temperature. The resulting leather treating composition, referred to herein as Composition 1, was effective in treating leather for water repellency, flex, tensile, elongation, texture, and feel. While the order of addition recited in this Example 1 was useful and effective to produce compositions and treated leather of the present invention, the order and rate of addition, mixing, admixing or combining of the components is not a critical limitation of this invention, and those skilled in the art can adjust the order and rate within known commercial and industrial practices. This example of a composition according to an embodiment of the present invention has the following approximate weight percentages:

| | |
|---|---|
| Component 1 = KW115 Intermediate | 20.0 wgt % |
| Component 2 = oleoyl sarcosine | 5.90 wgt % |
| Component 3 = caustic soda | 4.80 wgt % |
| Component 4 = Alfol 20+ | 2.70 wgt % |
| Component 5 = butyl propanol cosolvent | 14.00 wgt % |

-continued

| | |
|---|---|
| Component 6 = Busan 1078 | 0.10 wgt % |
| Component 7 = water | 52.50 wgt % |

Example 2

Treating Leather According to the Present Invention

The leather treating composition of Example 1 was used to treat leather as follows: Leather at the wet-blue stage was loaded into a drum mixer and a composition prepared by the method of example 1 was added at 4.5 weight percent based on actives. The leather and treating composition were stirred at 45 degrees C. for 1.5 hours, followed by drying of the leather at 40 degrees C. for 10 hours. For comparison, leather was also treated with a commercially available leather treatment material, Leukotan NS3, and the certain treatment parameters are presented in Table 1. The leather thickness was 2.0 to 2.2 millimeters and the initial pH of the wet-blue was 3.2 to 3.4.

TABLE 1

| | Leukotan NS3 | Composition 1 |
|---|---|---|
| Wet-blue weight (kg) | 5.4 | 5.32 |
| pH of neutralization | 4.82 | 4.77 |
| Dosage (wgt %) | 12 | 13.3 |
| Final pH | 3.79 | 3.74 |

Example 3

Testing of Leather Treated According to the Present Invention

The leather treated according to the procedure of Example 2 was tested for tensile strength (ASTM D2209-00, average of ten tests), elongation strength (ASTM D2211-00, average of ten tests), and Maeser flex (ASTM D22099-00, average of three samples), and compared to leather treated with a conventional leather treatment material, Leukotan NS3, as shown in Table 2.

TABLE 2

| Test | Leukotan NS3 | Composition 1 |
|---|---|---|
| Tensile strength | 21.90 N/mm$^2$ | 17.16 N/mm$^2$ |
| Elongation | 142% | 106% |
| Maeser flexes | 117,233 | 91,105 |

Different treatment parameters were employed in another example as follows and the test results are presented in Table 3. The leather thickness was 2.0 to 2.2 millimeters and the initial pH of the wet-blue was 3.3 to 3.54.

| | Leukotan NS3 | Composition 1 |
|---|---|---|
| Wet-blue weight (kg) | 5.28 | 5.41 |
| pH of neutralization | 4.70 | 4.7 |
| Dosage (wgt %) | 12 | 13.3 |
| Final pH | 3.82 | 3.85 |

TABLE 3

| Test | Leukotan NS3 | Composition 1 |
|---|---|---|
| Tensile strength | 15.77 N/mm$^2$ | 12.31 N/mm$^2$ |
| Elongation | 133% | 114% |
| Maeser flexes | 350,000 | 284,790 |

The leathers treated with Composition 1 were firmer and rounder than the leather treated with the conventional leather treatment material. The grain appearance in the leather treated with Composition 1 was equal to the grain appearance of the leather treated with the conventional leather treatment material. The inventive Composition 1 also exhibited better penetration than did the conventional leather treating composition.

Different treatment parameters were employed in another example as follows and the test results are presented in Table 4. The leather thickness was 1.2 to 1.4 millimeters and the initial pH of the wet-blue was 3.0 to 3.2.

| | Leukotan NS3 | Composition 1 |
|---|---|---|
| Wet-blue weight (kg) | 3.22 | 3.12 |
| pH of neutralization | 4.75 | 4.87 |
| Dosage (wgt %) | 12 | 13.3 |
| Final pH | 3.85 | 3.73 |

TABLE 4

| Test | Leukotan NS3 | Composition 1 |
|---|---|---|
| Tensile strength | 11.88 N/mm$^2$ | 10.06 N/mm$^2$ |
| Elongation | 68.6% | 46.2% |
| Maeser flexes | 261,241 | 234,562 |

The leathers treated with Composition 1 were firmer and rounder than the leather treated with the conventional leather treatment material. The grain appearance in the leather treated with Composition 1 was equal to the grain appearance of the leather treated with the conventional leather treatment material. Draws and wrinkles were equivalent between the samples. The break was tighter and the color was slightly lighter in the leather treated with the inventive composition than in the conventionally treated leather, but the inventive Composition 1 exhibited better penetration.

Different treatment parameters were employed in evaluating Composition 2 as follows and the test results are presented in Table 5. Composition 2 was the same as Composition 1, except for the addition of 2.0 wgt % of Butan 7802, a syntan. The leather thickness was 1.8 to 2.0 millimeters and the initial pH of the wet-blue was 3.0 to 3.3.

| | Composition 2 |
|---|---|
| Wet-blue weight (kg) | 5.45 |
| pH of neutralization | 5.57 |
| Dosage (wgt %) | 8 |

TABLE 5

| Test | Composition 2 |
|---|---|
| Tensile strength (avg of 12 tests) | 11.88 N/mm$^2$ |
| Elongation | 90.1% |
| Maeser flexes | 11,970 |

The leathers treated with Composition 2 were firm and round. The grain appearance in the leather treated with Composition 2 was good and there was improvement on the flank area (on emptiness) relative to the leather treated with Composition 1. The decrease in Maeser Flexes (11,970) for leather treated with Composition 2 relative to the Maeser Flexes (234,562) for leather treated with Composition 1 is due to two factors: the higher dosage of waterproof agent (8%) in the leather treated with Composition 2, and the addition of the syntan. This example demonstrates the negative effect of the addition of syntan on flex and waterproof performance because the syntan is hygroscopic and thus tends to absorb water. However, the flex performance may be completely acceptable for certain leather or hide products. In addition, the formulation of Composition 2 has desirable environmental advantages relative to the potentially harmful effects of conventional leather treating formulations.

Different treatment parameters were employed in evaluating Composition 3 as follows and the test results are presented in Table 6. Composition 3 was the same as Composition 1, except for the addition of 2.0 wgt % of Butan 7805, an organic filling syntan. The leather thickness was 2.0 to 2.2 millimeters and the initial pH of the wet-blue was 3.3 to 3.4.

| | Composition 3 |
|---|---|
| Wet-blue weight (kg) | 5.88 |
| pH of neutralization | 4.71 |
| Dosage (wgt %) | 8 |
| Final pH | 3.84 |

TABLE 6

| Test | Composition 3 |
|---|---|
| Tensile strength (avg of 12 tests) | 18.0 N/mm$^2$ |
| Elongation | 90.1% |
| Maeser flexes | 14,782 |

The leathers treated with Composition 3 were firm and round. The grain appearance in the leather treated with Composition 3 was good and there was improvement on the flank area (on emptiness) relative to the leather treated with Composition 1. The decrease in Maeser Flexes (14,782) for leather treated with Composition 3 relative to the Maeser Flexes (234,562) for leather treated with Composition 1 is due to two factors: the higher dosage of waterproof agent (8%) in the leather treated with Composition 3, and the addition of the syntan. However, the flex performance may be completely acceptable for certain leather or hide products. In addition, the formulation of Composition 3 has desirable environmental advantages relative to the potentially harmful effects of conventional leather treating formulations.

Different treatment parameters were employed in evaluating Composition 4 as follows and the test results are presented in Table 7. Composition 4 was the same as Composition 1, except for the addition of 1.0 wgt % of wattle, a vegetable extract commercially available as Spray Dried Wattle Extract from Pilar River Plate Corporation. The leather thickness was 2.0 to 2.2 millimeters and the initial pH of the wet-blue was 3.4 to 3.5.

| | Composition 4 |
|---|---|
| Wet-blue weight (kg) | 9.07 |
| pH of neutralization | 4.91 |
| Dosage (wgt %) | 12 |
| Final pH | 3.81 |

TABLE 7

| Test | Composition 4 |
|---|---|
| Tensile strength (avg of 12 tests) | 19.4 N/mm$^2$ |
| Elongation | 105.4% |
| Maeser flexes | 24,852 |

The leathers treated with Composition 4 were firm and round. The grain appearance in the leather treated with Composition 4 was excellent and there was no improvement on the flank area (on emptiness) relative to the leather treated with Composition 1. The decrease in Maeser Flexes (24,852) for leather treated with Composition 4 relative to the Maeser Flexes (234,562) for leather treated with Composition 1 is due to the addition of the wattle which even in small quantities will affect the waterproof performance of leather. The leather treated with Composition 4 had a very soft, silk-like feeling. However, the flex performance may be completely acceptable for certain leather or hide products. In addition, the formulation of Composition 4 has desirable environmental advantages relative to the potentially harmful effects of conventional leather treating formulations.

Different treatment parameters were employed in evaluating Composition 5 as follows and the test results are presented in Table 8. Composition 5 was the same as Composition 1, except for the addition of 1.0 wgt % of Butan 7805, an organic filling syntan. The leather thickness was 2.4 to 2.6 millimeters and the initial pH of the wet-blue was 3.3 to 3.4.

| | Composition 5 |
|---|---|
| Wet-blue weight (kg) | 6.00 |
| pH of neutralization | 5.12 |
| Dosage (wgt %) | 10 |
| Final pH | 3.67 |

TABLE 8

| Test | Composition 5 |
|---|---|
| Tensile strength (avg of 12 tests) | 20.3 N/mm$^2$ |
| Elongation | 80.6% |
| Maeser flexes (avg of 3 samples) | 60,705 |
| Maeser flexes (avg of 3 samples; No chrome cap at end) | 12,360 |

The leathers treated with Composition 5 were firm and round and the grain appearance in the leather treated with Composition 5 was good. This example demonstrates the improvement in flex obtained by the chrome capping post treatment step (60,705 flexes) compared to leather not post treated with chrome capping (12,360 flexes).

Further exemplification of certain embodiments of the present invention is provided in the additional single-component compositions below. None of these compositions contain oleoyl sarcosine, Alfol 20+, preservative, or butylpropanol.

Composition 6=30% aqueous solution of the sodium salt of $C_{18}$ alphaolefin-maleic acid copolymer (Na-Pama 18)

Composition 7=30% aqueous solution of the sodium salt of $C_{24}$–$C_{28}$ alphaolefin-maleic acid copolymer (Na-Pama 2428)

Composition 8=30% aqueous solution of the sodium salt of $C_{14}$ alphaolefin-maleic acid copolymer (Na-Pama 14)

Composition 9=20% aqueous solution of the potassium salt of styrene-maleic acid, 22% styrene, 110,000 amu Composition 10=20% aqueous solution of the potassium salt of styrene-maleic acid, 28% styrene, 110,000 amu Composition 11=20% aqueous solution of the potassium salt of styrene-maleic acid, 32% styrene, 110,000 amu

TABLE 9

| | Maeser Flexes |
|---|---|
| Composition 6 | 41,915 |
| Composition 7 | 146,246 |
| Composition 8 | 31,910 |
| Crodasinic O | 488 |
| Lubritan WP | 157,229 |
| Zonyl 9027 | 32,961 |
| ScotchGard | 3,144 |

The conventional waterproofing materials of Table 9 include Crodasinic O, (oleoyl sarcosine); Lubritan WP; Zonyl 9027 (an aminosilicone from DuPont, Wilmington, Del.); and ScotchGard (a fluorocarbon water proofing formulation from 3M, St. Paul, Minn.). The results of Table 9 show that the single-component compositions of the invention exhibited Maeser flex test performance generally equal to the common waterproofing materials. For certain applications, some of the test results from the single-component embodiments of the present invention are not optimum, but nevertheless can be acceptable, particularly in view of the improved environmental impact of these formulations relative to the impact of conventional leather treating solutions. Thus, the present invention, in another embodiment, provides several single-component and, when an aliphatic acid amide is added, two-component leather treatment formulations.

Table 10 shows a different flex test result comparing Compositions 9, 10, and 11 with two commercially available waterproofing aqueous formulations, Evco PWRH (a 25% aqueous solution of recycled/modified polyethylene), and DuPont TLF (a silicone waterproofing formulation from DuPont, Wilmington, Del.).

TABLE 10

| | Maeser Flexes |
|---|---|
| Composition 9 | 370 |
| Composition 10 | 275 |
| Composition 11 | 901 |
| Evco PWRH | 465 |
| DuPont TLF | 1649 |

The results of Table 10 illustrate that the compositions of the present invention exhibit flex performances comparable to the flex performances of the conventional waterproofing formulations.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A composition comprising:

a) at least one hydrocarbon-substituted carboxylic acid anhydride or the alkali salt thereof;

b) at least one aliphatic acid amide;

c) caustic soda;

d) at least one $C_{12}$ or higher fatty alcohol;

e) at least one $C_{10}$ or lower alcohol cosolvent;

f) at least one preservative; and g) water.

2. The composition of claim 1, wherein hydrocarbon-substitution of the carboxylic acid anhydride or salt thereof comprises an alpha olefin.

3. The composition of claim 1, wherein hydrocarbon-substitution of the carboxylic acid anhydride or salt thereof is with a substituent selected from polyethylene, polypropylene, polyisopropylene, polybutylene, polyisobutylene, an oligomer of 1-octane, an oligomer of 1-decene, an oligomer of 1-dodecene, a comonomer thereof, a copolymer thereof, or mixtures thereof.

4. The composition of claim 1, wherein the aliphatic acid amide has an aliphatic carbon chain length of $C_{10}$ and above.

5. The composition of claim 1, wherein the aliphatic acid amide comprises oleoyl sarcosine.

6. The composition of claim 1, wherein the aliphatic acid amide comprises an oleic acid amide of sarcosine.

7. The composition of claim 1, wherein the aliphatic acid amide comprises a linear carboxylic acid amide.

8. The composition of claim 1, wherein the caustic soda is 10 to 90 weight percent solids in water.

9. The composition of claim 1, wherein the caustic soda is about 50 weight percent solids in water.

10. The composition of claim 1, wherein the fatty alcohol comprises a $C_{12}$ or longer alkyl carbon chain.

11. The composition of claim 1, wherein the fatty alcohol comprises a mixture of substantially linear fatty alcohols of $C_{20}$, $C_{22}$, and $C_{24}$.

12. The composition of claim 1, wherein the fatty alcohol comprises a $C_{20}$ alcohol.

13. The composition of claim 1, wherein the fatty alcohol comprises of at least one alkyl alcohol with a carbon chain of $C_{12}$ or longer.

14. The composition of claim 1, wherein the fatty alcohol is a blend comprising substantially linear fatty alcohols of $C_{20}$, $C_{22}$, and $C_{24}$.

15. The composition of claim 1, wherein the alcohol cosolvent comprises an alcohol with a chain length of $C_{10}$ or less.

16. The composition of claim 1, wherein the alcohol cosolvent comprises butylpropanol.

17. The composition of claim 1, wherein the alcohol cosolvent is butylpropanol.

18. The composition of claim 1, wherein the alcohol cosolvent is butylethanol.

19. The composition of claim 1, wherein the alcohol cosolvent comprises a mixture of alcohols, wherein each alcohol has a chain length of $C_{10}$ or less.

20. The composition of claim 1, wherein the alcohol cosolvent comprises pentylpropanol.

21. The composition of claim 1, wherein the alcohol cosolvent comprises propylpropanol.

22. The composition of claim 1, wherein the alcohol cosolvent comprises 2-ethyl hexanol.

23. The composition of claim 1, wherein the preservative is isothiazolinone.

24. The composition of claim 1, wherein said composition comprises:

a. from about 10 to about 30 weight percent of a poly-alpha-olefin substituted poly(maleic anhydride);

b. from about 3 to about 10 weight percent of the oleic acid amide of sarcosine;

c. from about 3 to about 10 weight percent of caustic soda, 50% solids in water, d. from about 1 to about 5 weight percent of a blend of $C_{20}$–$C_{22}$ fatty alcohols;

e. from about 10 to about 20 weight percent butylpropanol;

f. from about 0.05 to about 1.50 weight percent preservative; and g. from about 20 to about 80 weight percent water, all based on the weight of the composition.

25. The composition of claim 24, wherein:

said poly-alpha-olefin substituted poly(maleic anhydride) is present at about 20 weight percent;

said oleic acid amide of sarcosine is present at about 5.9 weight percent;

said caustic soda is present at about 4.8 weight percent;

said blend of $C_{20}$–$C_{22}$ fatty alcohols is present at about 2.7 weight percent;

said butylpropanol is present at about 14.0 weight percent;

said preservative is present at about 0.10 weight percent; and said water is present at about 52.50 weight percent.

26. A method for imparting water repellency to leather, said method comprising treating said leather with the composition of claim 1 to impart said water repellency to the leather.

27. The method of claim 26, wherein the leather is contacted with the composition of claim 1 while the leather is in the wet blue stage of leather treatment.

28. The method of claim 26, wherein the hydrocarbon-substituted carboxylic acid anhydride or the alkali salt thereof is an alkali salt of poly-alpha-olefin substituted poly(maleic anhydride) or an alkali salt of a styrene-maleic acid copolymer; and wherein the aliphatic acid amide is the oleic acid amide of sarcosine.

29. Treated hide comprising hide treated with the composition of claim 1.

30. Treated leather comprising leather treated with the composition of claim 1.

31. A leather-treating composition comprising:

at least about 10 weight percent of a poly-alpha-olefin substituted poly(maleic anhydride);

at least about 3 weight percent of the oleic acid amide of sarcosine;

at least about 3 weight percent of caustic soda, delivered as 50% sodium hydroxide solids in water;

at least about 1 weight percent of a blend of $C_{20}$–$C_{22}$ fatty alcohols;

at least about 10 weight percent butylpropanol;

at least about 0.05 weight percent preservative; and at least about 20 weight percent water, all based on the total weight percent of the composition.

32. A composition comprising:

at least about 10 weight percent of a sodium salt of poly-alpha-olefin substituted poly(maleic anhydride);

at least about 3 weight percent of the oleic acid amide of sarcosine;

at least about 1 weight percent of a blend of $C_2$–$C_{22}$ fatty alcohols;

at least about 10 weight percent butylpropanol;

at least about 0.05 weight percent preservative; and at least about 20 weight percent water.

33. A composition comprising:

at least about 10 weight percent of a potassium salt of poly-alpha-olefin substituted poly(maleic anhydride);

at least about 3 weight percent of the oleic acid amide of sarcosine;

at least about 1 weight percent of a blend of $C_{20}$–$C_{22}$ fatty alcohols;

at least about 10 weight percent butylpropanol;

at least about 0.05 weight percent preservative; and at least about 20 weight percent water.

34. A leather-treating polymer composition comprising at least one alpha-olefin substituted carboxylic acid anhydride or the alkali salt thereof.

35. The leather-treating composition of claim 34, further comprising at least one aliphatic acid amide or the alkali salt thereof.

36. The composition of claim 34, wherein the alkali of the alkali salt is sodium or potassium.

37. A leather-treating composition comprising an aqueous solution of an alkali salt of an alpha-olefin substituted-maleic acid copolymer.

38. The leather-treating composition of claim 37, further comprising at least one aliphatic acid amide or the alkali salt thereof.

39. The composition of claim 37, wherein the alkali of the alkali salt is sodium or potassium.

40. Leather or hide treated by the composition of claim 34.

41. Leather or hide treated by the composition of claim 35.

42. Leather or hide treated by the composition of claim 36.

43. Leather or hide treated by the composition of claim 37.

44. Leather or hide treated by the composition of claim 38.

45. Leather or hide treated by the composition of claim 39.

46. A leather treatment composition comprising an aqueous solution of a) an alkali salt of an alphaolefin substituted-maleic acid copolymer or an alkali salt of a styrene-maleic acid copolymer, and b) an oleic acid amide of sarcosine.

* * * * *

UNITED STATES PATENT AND TRADEMARK OFFICE

CERTIFICATE OF CORRECTION

PATENT NO. : 6,753,369 B2
DATED : June 22, 2004
INVENTOR(S) : Hill Jr. et al.

It is certified that error appears in the above-identified patent and that said Letters Patent is hereby corrected as shown below:

Column 14,
Line 26, "octane" should read -- octene --.

Column 16,
Line 13, "$C_2$ - $C_{22}$" should read -- $C_{20}$ - $C_{22}$ --.

Signed and Sealed this

Thirtieth Day of November, 2004

JON W. DUDAS
*Director of the United States Patent and Trademark Office*